United States Patent [19]

Piasecki et al.

[11] Patent Number: 4,591,112

[45] Date of Patent: May 27, 1986

[54] VECTORED THRUST AIRSHIP

[75] Inventors: Frank N. Piasecki, Haverford; Donald N. Meyers, Elkins Park, both of Pa.

[73] Assignee: Piasecki Aircraft Corporation, Sharon Hill, Pa.

[21] Appl. No.: 084,234

[22] Filed: Oct. 12, 1979

Related U.S. Application Data

[63] Continuation of Ser. No. 763,486, Jan. 28, 1977, abandoned, which is a continuation of Ser. No. 611,750, Sep. 9, 1975, abandoned.

[51] Int. Cl.⁴ ............................................... B64B 1/34
[52] U.S. Cl. .................................. 244/26; 244/17.13; 244/2
[58] Field of Search ............ 244/2, 17.11, 17.13, 244/17.21, 17.23, 25, 26, 30

[56] References Cited

U.S. PATENT DOCUMENTS

| | | | |
|---|---|---|---|
| 1,615,002 | 1/1927 | Avery | 244/26 |
| 1,821,158 | 9/1931 | Howland | 244/2 |
| 1,879,345 | 9/1932 | Lawrence | 244/26 |
| 3,008,665 | 11/1961 | Piasecki | 244/2 |
| 3,096,047 | 7/1963 | Dunn, Jr. | 244/26 |
| 3,222,012 | 12/1965 | Piasecki | 244/17.21 |
| 3,656,723 | 4/1972 | Piasecki et al. | 244/2 |
| 3,746,279 | 7/1973 | Maciolek et al. | 244/17.13 |
| 3,801,044 | 4/1974 | Moore | 244/30 |
| 3,889,902 | 6/1975 | Madet | 244/17.23 |

*Primary Examiner*—Galen L. Barefoot
*Attorney, Agent, or Firm*—Willard M. Hanger

[57] ABSTRACT

An airship with provisions for vectored thrust provided by a plurality of controllable pitch rotor thrust producing units attached to the elongated aerostat hull spaced from and on opposite sides of the center of overall mass of the airship. The pitch control systems for the rotors of all thrust units include collective and cyclic pitch controls of the main, horizontally rotating lifting rotors and the control systems are interconnected to be operable by a master control which establishes both similar and differential pitch settings of the rotors of selected thrust units in a manner to establish vectored thrust in directions which establish the required amounts of vertical lift, propulsion thrust, trim and control forces to control all flight aspects of the airship.

24 Claims, 12 Drawing Figures

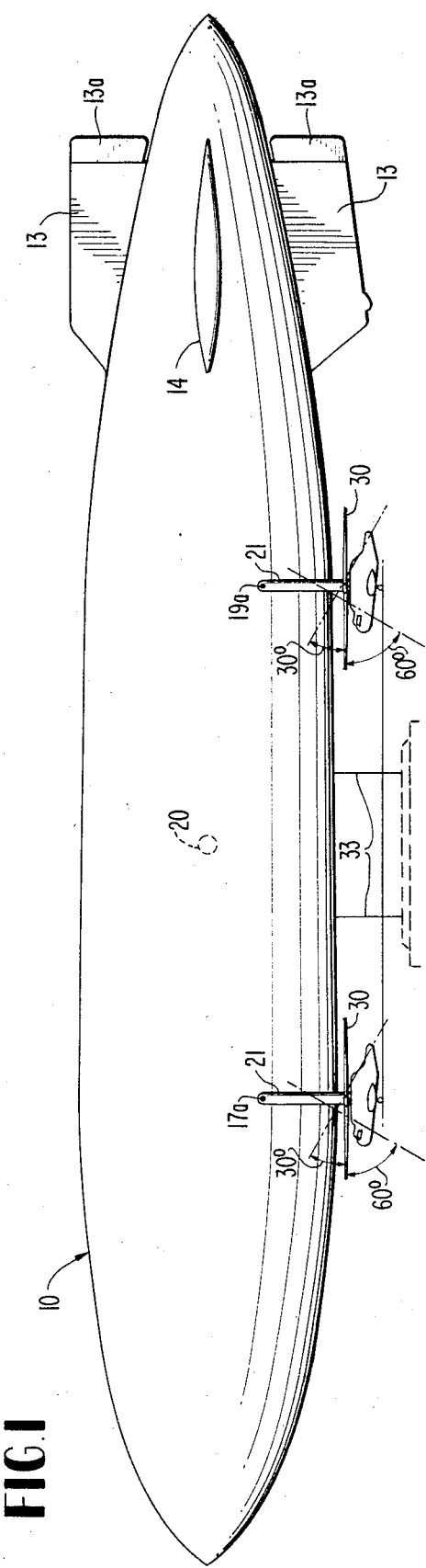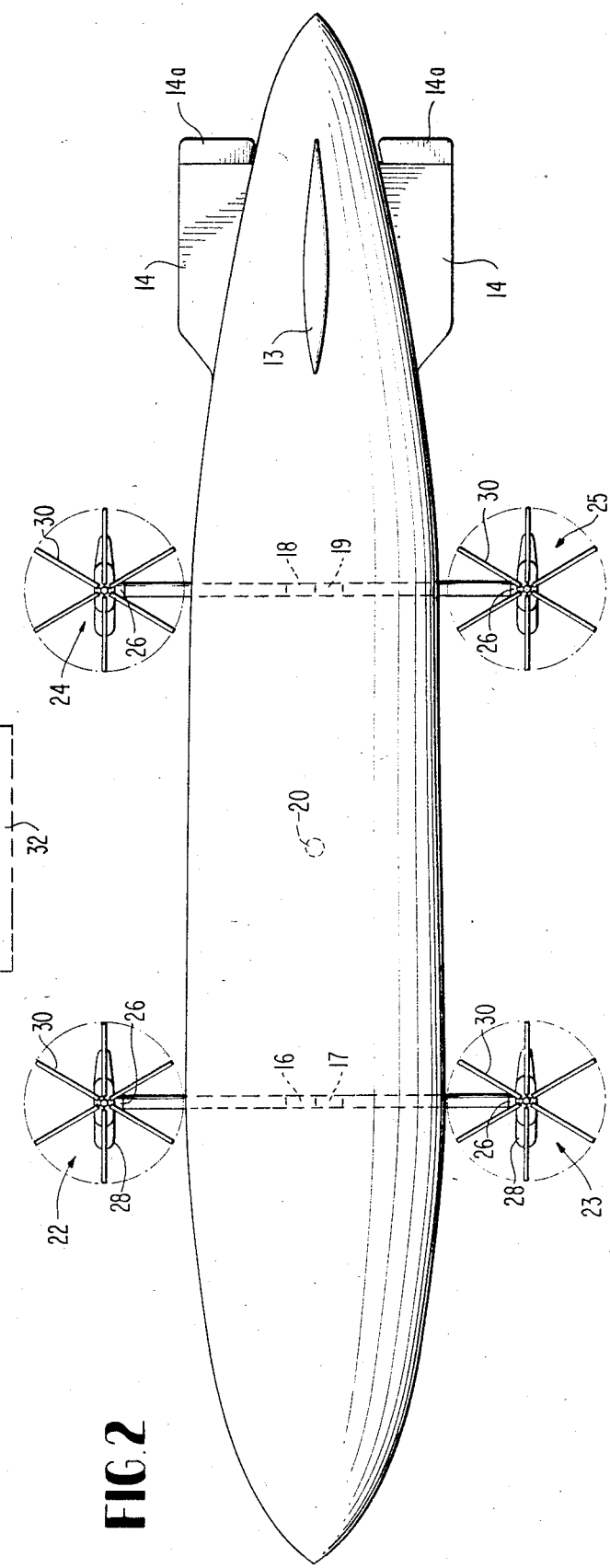
FIG.1
FIG.2

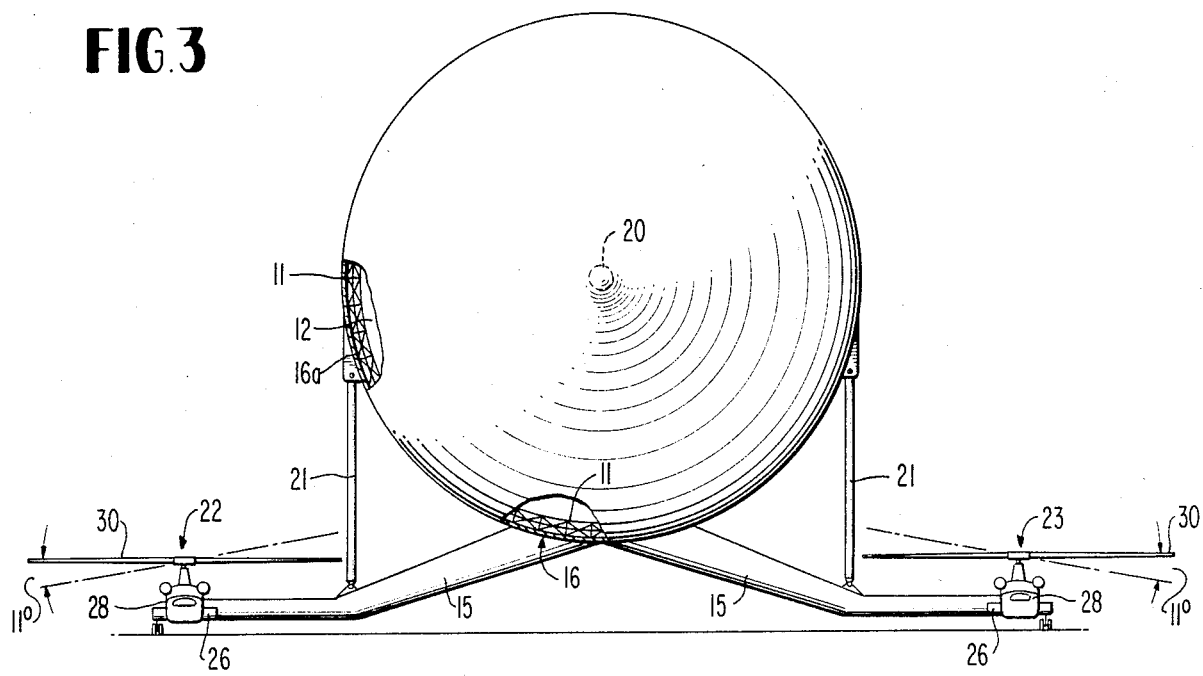
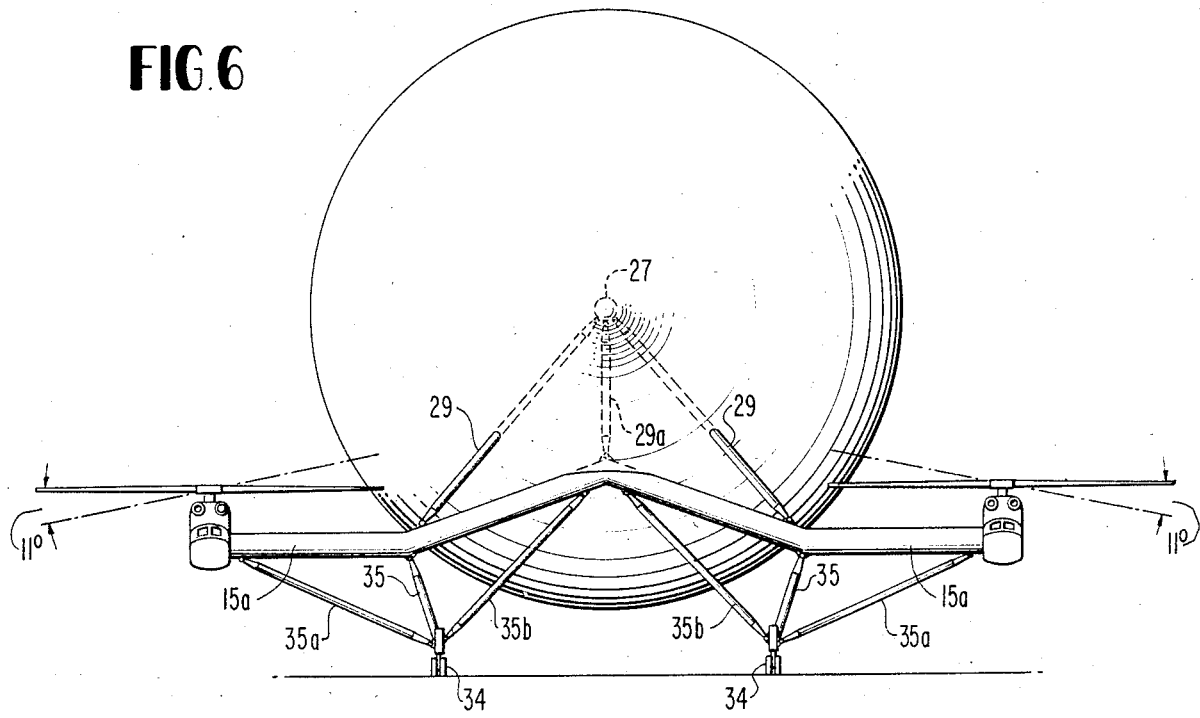

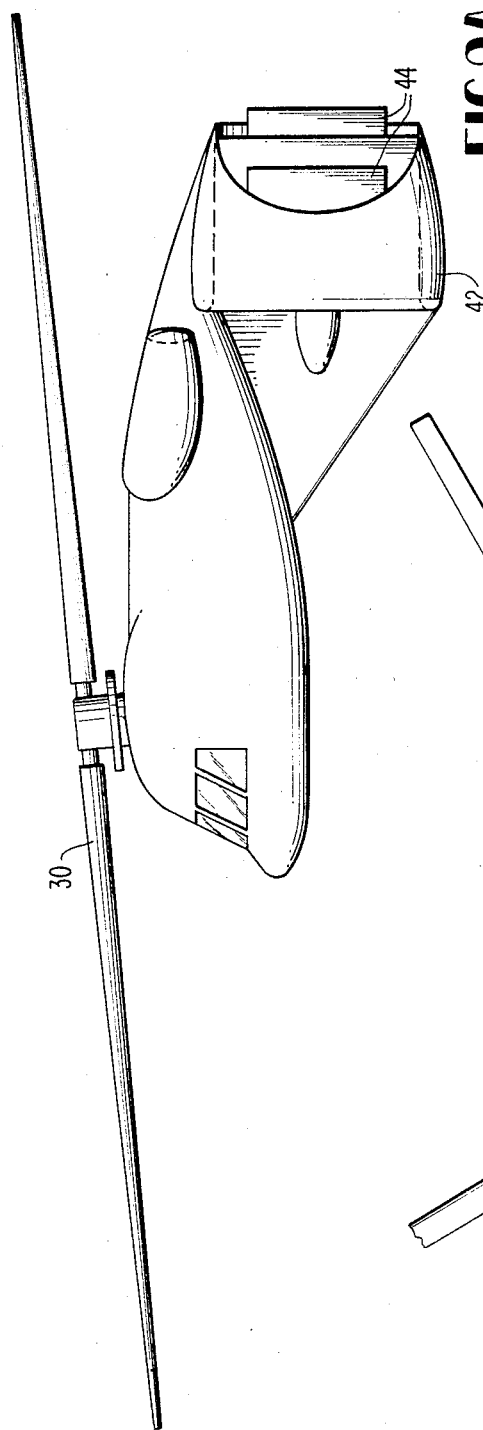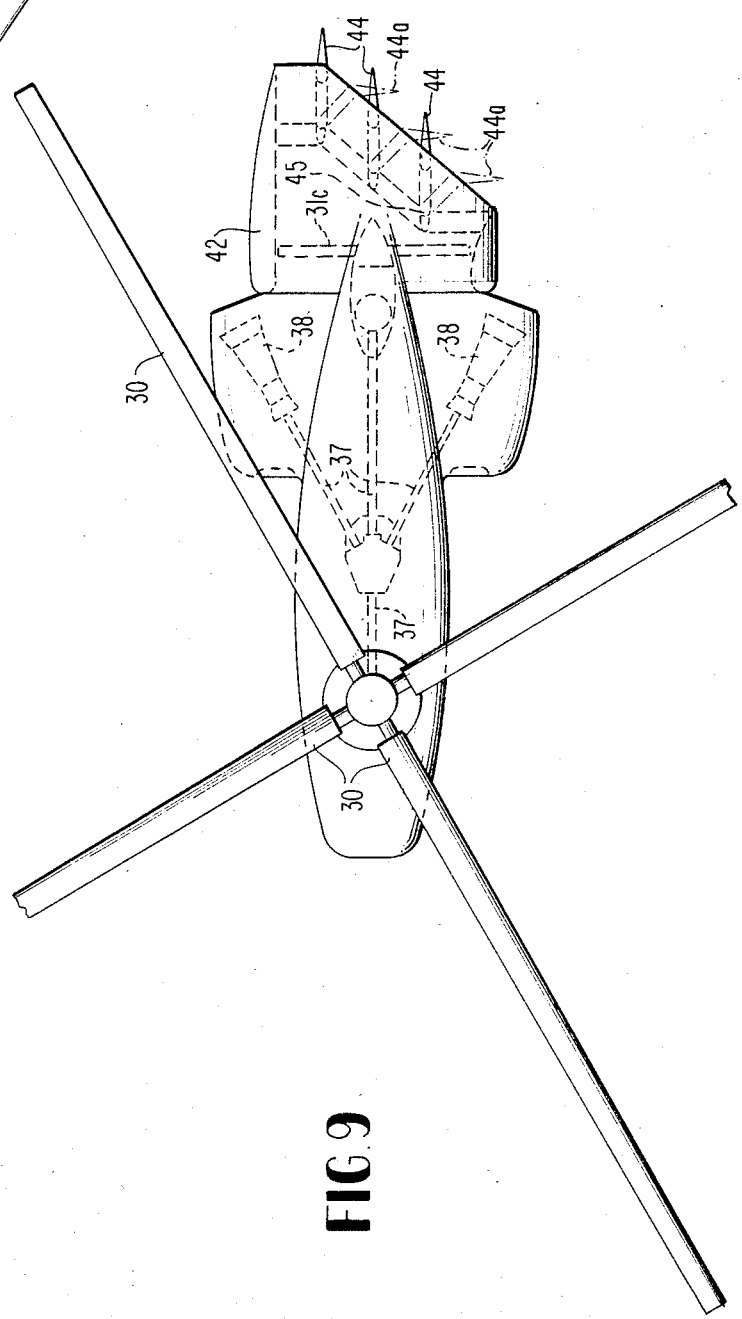

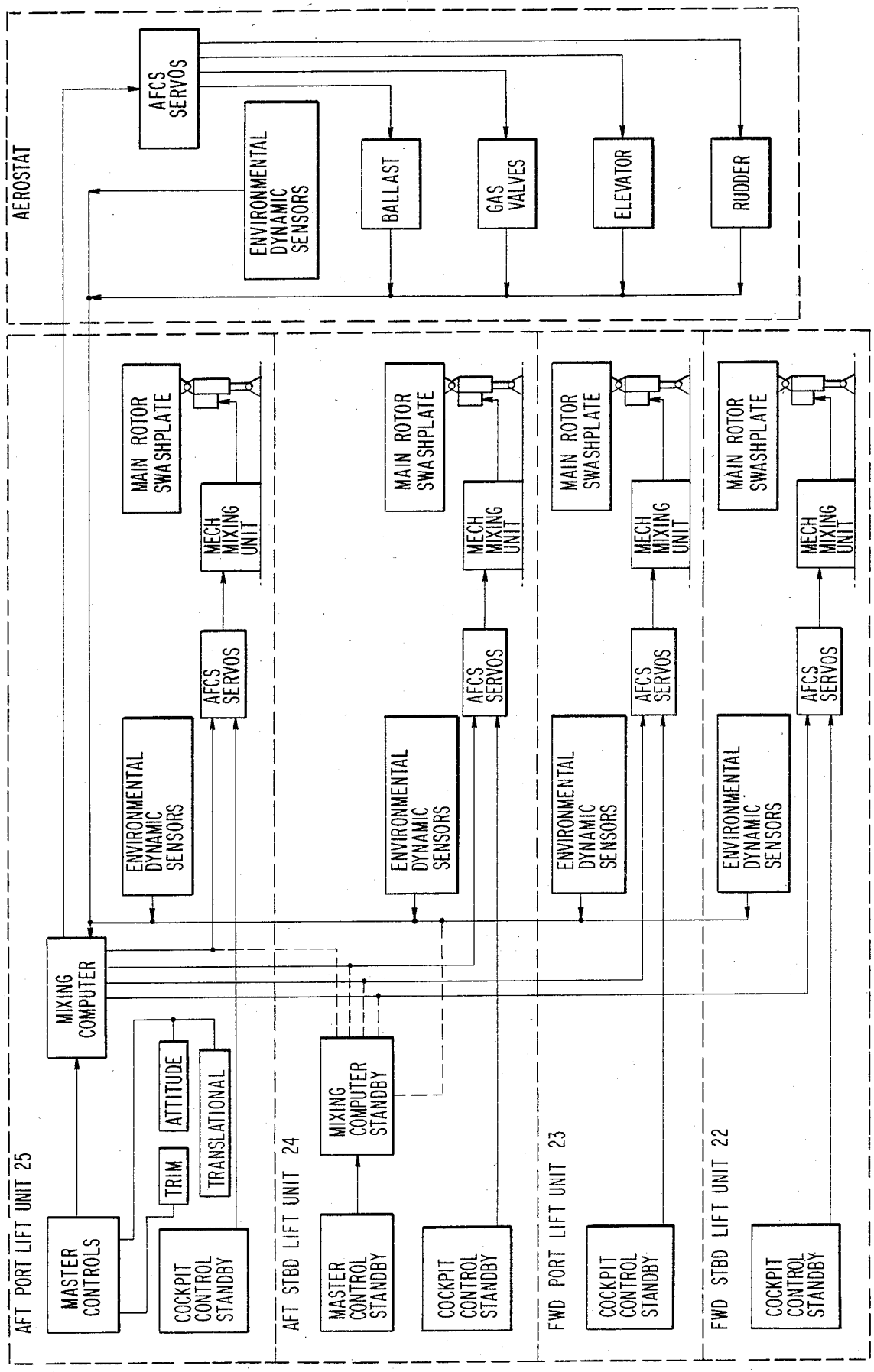

VECTORED THRUST AIRSHIP

This is a continuation of application Ser. No. 763,486 filed Jan. 28, 1977, which is a continuation of Parent Application Ser. No. 611,750, filed Sept. 9, 1975, which is relied upon and the entire disclosure and specification of which is hereby incorporated by reference, both are abandoned.

BACKGROUND OF THE INVENTION

This invention relates to an airship employing the vectored thrust obtained from thrust producing rotor systems affixed to the aerostat hull of the airship as a means of providing dynamic lift, translational movement of the airship and the application of control forces establishing the desired attitude of the airship in flight and in hover.

Although airplane payloads for long-haul transportation have increased steadily in recent years, there is a growing need for the vertical lifting of large payloads over short distances, particularly payloads comprising single integrated structures of relatively large dimensions, such as power plant assemblies, boilers, transformers, atomic power components, pre-fabricated structures, etc. Helicopters have been utilized for the vertical lift short-haul operations but the size payload that can be lifted by a helicopter is limited. The commercial helicopter having the largest capacity available today will lift a load of 10 tons. Larger helicopters are under development of which one has a lifting capacity of 18 tons. However, there is a growing need for transporting large indivisible loads of 25 to 100 tons or more over routes in which vertical airlift capability to lift these loads is the only feasible mode of transportation. Increasing vertical lift capability through rigidly connecting together several helicopters in the manner of U.S. Pat. No. 3,656,723 appears to be feasible. However, the lifting capability of such multiple helicopter lift systems, utilizing presently available or projected helicopters, still falls considerably short of present and predicted vertical load requirements. Since the payload/gross weight ratio of aerodynamically supported vehicles diminishes with increase in size due to the cube/square relationship of structural weight and lift, further increases in size of helicopters or multiple helicopter lift systems would involve increasingly less vertical lift capacities per pound of aircraft in the larger sizes such that further appreciable increase in size of helicopter units would be extremely expensive.

A further concept of increasing the vertical lifting capacity of two interconnected helicopters by tethering a balloon above the center of gravity of the interconnected helicopters is disclosed in U.S. Pat. No. 3,008,665. However, the high drag of the balloon coupled with the problem of coordinating movements of the independently operating helicopters makes such an arrangement impractical for most operations except at extremely low speed and over very limited ranges. The proposed arrangement could also not be used in any except ideal weather conditions of very low wind velocity and gustiness due to the inability of coordinating motion of the tethered balloon with that of each of the two independently controlled helicopters.

Lighter-than-air craft have long been advocated as mediums for the transportation of large payloads since the lifting capacity of the airship increases as the cube of the size whereas the structural increase is in the ratio of the square of the size, as the case in aerodynamically supported vehicles. However, a large aerostat is a slow responding vehicle. The hull characteristics of the conventional airship in forward flight make it unstable in both yaw and pitch. Conventional airships have no capability for developing a side force other than flying at a yawed angle nor do they have a controllable vertical lifting force other than by ballasting or valving lifting gas and flying at an angle of attack. Airships are notoriously poor in yaw controllability, particularly since the moments of inertia of even the smaller airships are many times larger than those of the largest heavier-than-air craft. The only means of controlling airships in yaw and pitch is through the rudder and elevator surfaces which have relatively small aspect ratios and are operating to a considerable extent in the boundary layer of the airship hull. At low and zero forward speeds the controllability of airships is very low, approaching zero, and the ability of a conventional airship to hold position or heading in gusty air is very poor. Thus, although a conventional airship of large size has inherent capabilities of providing large vertical lift capability, its capability of highly controlled hover flight are extremely poor. One of the requirements of the large vertical lift load carrying capability is that the carrying vehicle be capable of lifting or depositing payloads from a precise ground location and in a precisely determined alignment and azimuth. Thus, the large vertical load capacity vehicle, which must pick up and deposit the payload in the mode of the crane, must have a high degree of controllability in hover flight in addition to the ability of flying under good control at moderate speeds.

An object of this invention is to provide an airborne vehicle with the capacity of a heavy lift crane of almost unlimited payload capacity.

Another object of this invention is to provide an airborne vehicle of moderate range having a very large vertical lifting capability and capable of a very high degree of controllability in direction of motion and attitude, particularly in hover flight.

Still another object of this invention is to provide a lighter than-air craft of large size having a high degree of controllability in all flight modes but particularly in the hover flight mode.

Still yet another object of this invention is to provide a lighter-than-air craft vehicle of large payload capacity and capable of highly precise hovering flight in which its flight controllability and wind and ground handling problems are a minimum.

SUMMARY OF THE INVENTION

These objects have been achieved by affixing to the hull of the aerostat of a lighter-than-air craft a thrust producing rotor system of the type used in helicopters and affixing the rotor thrust systems to the aerostat hull on opposite sides and spaced from the airship center of mass to produce an airship which employs vectored thrust as a means of providing both dynamic lift and a high ddegree of controllability for maneuvering flight as well as hovering flight. This is achieved by vectoring and summing the thrust produced by the rotor systems that are rigidly connected to the aerostat hull and spaced from the center of mass so as to establish attitude control moments. The rotor blade pitch control systems of all thrust producing units, which include main lifting rotors having collective and cycling pitch, are interconnected and operable from a master control. Operation of the master control establishes both similar and differential pitch settings of the collective pitch as well as the cyclic pitch of the rotors of selected thrust units in a manner that establishes the vectored thrust in directions providing the desired vertical lift, propulsion, trim and control forces for the desired mode of flight of the airship.

BRIEF DESCRIPTION OF DRAWINGS

FIG. 1 is a side elevation of one embodiment of the invention incorporating a conventional rigid airship hull similar to the naval airship Akron.

FIG. 2 is a plan view from above of the embodiment of FIG. 1.

FIG. 3 is a front elevation view of the embodiment of FIG. 1 with a small cutaway section.

FIG. 6 is a front elevation view of the embodiment of FIG. 4.

FIGS. 9 and 9A are side and plan views of a further variation of the thrust units illustrated in the embodiments of FIGS. 1-8.

FIG. 10 is a schematic diagram of one typical control interconnection system.

DESCRIPTION OF TYPICAL EMBODIMENTS

Figure 4:
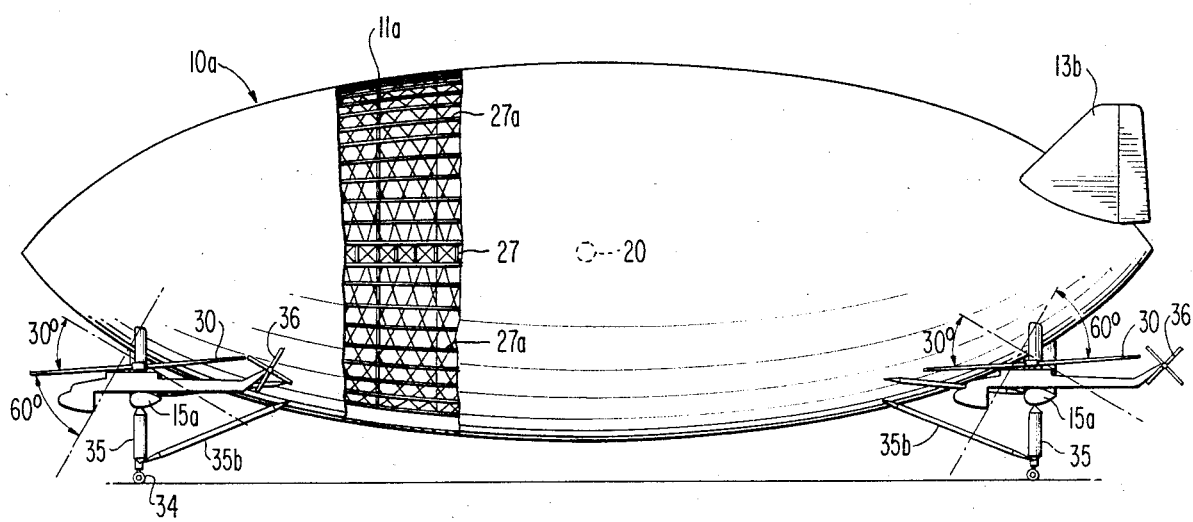
FIG. 4 is a side elevation with a small cutaway section of a second embodiment of the invention utilizing a modified rigid airship structure and more sophisticated thrust units.

FIGS. 1-3 illustrate an embodiment utilizing the hull of a typical rigid airship in which the hull 10 comprises a typical rigid airship structure having circumferential rings 11 spaced apart along the length of the airship and connected together by longitudinally extending members with the individual gas cells 12 located in the space between the rings to provide compartmentation. The rigid framework within which the gas cells are supported is covered with some type of covering (usually fabric) and no further description of the well known rigid airship structure is necessary, this structure forming no part of the invention. Although not essential to flight control, the airship hull can incorporate the conventional fins or vertical stabilizers 13 and rudders 13a as well as horizontal stabilizers 14 and elevators 14a. Although fins are shown in this embodiment, they can be disadvantageous in slow flight speed operations due to unsymetrical weight distribution and the reaction of tail surfaces to transverse gusts would accentuate the control problem. Since the function of the conventional fins is replaced by other control means to be subsequently described, the conventional fins might well be eliminated. Laterally extending semi-cantilever beams 15 are attached to the airship hull, in this instance, probably the rings 11, at points 16, 16a, 17, 17a, 18, 18a, 19, and 19a forwardly and rearwardly of the center of mass 20 of the vehicle to extend outwardly on each side of the longitudinal axis of the airship hull, utilizing vertical struts 21 for stiffening if necessary. Four vertical lift or thrust producing units 22, 23, 24, 25 are attached to the outer end of each lateral beam 15 through a hinge type mounting 26 which allows angular displacement of the lifting unit around the pitch axis which extends horizontally transversely of the airship hull. The angular motion about the pitch axis is to permit the lifting unit to be tilted forwardly or rearwardly so that a component of the lifting rotor thrust will be parallel to the longitudinal axis and the line of flight of the airship. The angular displacement of the lifting unit can conveniently be approximately 60° forwardly to 30° rearwardly, although these angles are approximate and not particularly critical. Also the tilting feature can be eliminated and the pivotable hinge mounting 26 eliminated with the lifting units rigidly connected to the lateral beam 15, as desired as fore and aft thrust components can be obtained through cyclic pitch of the lifting unit main rotor as will be subsequently discussed. The lift unit hinge 26 can also be designed to allow for angular displacement of each lifting unit about its roll axis, which extends parallel to the airship longitudinal axis. The angular displacement might be in the region of 11° and would probably be outboard only to avoid interference between the lift unit main rotor and the support beam, although inboard tilt is possible. The purpose of the tilt provision about the roll axis of each lifting unit would be to establish a component of thrust for trim purposes transversely of the airship longitudinal axis. The hinged mounting 26 has provision for locking at any desired pivotal position so as to lock each lifting unit at an optimum angle in pitch, or roll as might be desired. The hinge mounting 26 can include or be connected to an actuator which rotates the lifting unit to the desired angle at which it is locked in place.

Each lift unit comprises a simple fuselage structure 28 housing the engine and other components including provisions for a stand-by pilot, if desired, with a horizontally rotating, main lifting rotor 30 mounted atop the fuselage. The main lift rotor is of the controllable pitch, multiple blade type conventionally used in helicopters incorporating both collective pitch and cyclic pitch control. The lift unit mounting attachment 26 restrains motion of the lifting unit about its yaw axis so that no tail rotor is illustrated in the embodiment of FIGS. 1-3, although a tail rotor of the conventional type could be incorporated into the lift unit. It should be understood that each lifting unit could take the form of a conventional helicopter attached to the support beam 15 through a suitable mounting attachment. It is envisioned that each lifting unit would be an integral system similar to or actually a conventional helicopter with engines, fuel supply and the usual engine and rotor blade controls that establish the pitch of all rotor blades, including the main lifting rotor collective and cyclic pitch and the pitch of any tail rotor that might be installed. Although all illustrated lifting units are of the single main rotor type, each lifting unit could incorporate multiple main lift rotors of the tandem or other types.

Provisions for attaching payloads to the airship hull could take many forms. The payloads could be carried externally through external attachments to the airship or provisions could be incorporated for openings in the bottom of the hull, as was the case in the Akron and Macon airships, for hoisting payload items into and transporting them inside the hull. FIG. 1 shows a simple type of arrangement in which a payload 32 (represented in dotted line) is supported by cables 33 connected to a winch inside the airship, the winch raising and lowering the payload at the ground delivery point while the airship hovers over the delivery point through the vector control forces to be described subsequently.

Although the lift producing units 22, 23, 24, 25 are envisioned to be integral units with self-contained power plants and a fuel supply similar to or constituting a helicopter as described above, the engines driving the main lifting rotors 30 and the fuel supply could be housed within the supporting beams 15 or the airship hull, although this would involve added weight due to lengths of shafting to drive the main rotors. However, this would have the advantage of interconnecting the pairs of lift rotors located oppositely on each side of the hull or of all rotors so that a major portion of full power of the lift units could be maintained on all lifting rotors in the event of an engine failure. In the illustrated embodiment of lifting units, in which the main lift rotors of each unit are powered by two turbine engines, in the event of failure of an engine in one of the lift units, such as unit 22, only 50% of the power of the symetrically opposite lift unit 25 would be used, in order to maintain the trim of the vehicle. Thus, in an eight-engine arrangement of the type envisioned for FIGS. 1–3, when carrying maximum design payload, each engine would be called upon to supply three-fourths of its rated power, and the total power supplied would equal six times the rated power of each engine. Then, should one engine fail, the other engine in that lift unit would be increased to full power, the engines in the symetrically opposite lift unit would each be reduced to one-half rated power, the engines in the two unaffected lift units would be increased to full power, and the total power would remain at six times the rated power of one engine, as before.

The pitch of the blades of the main lifting rotors 30 of each lift unit can be controlled by conventional mechanical rotor control actuators through the usual control signal inputs from control units located within the fuselage of each lifting unit. In the case of the single rotor lifting unit, illustrated in FIGS. 1–3, these controls involve collective pitch of the rotor blades as well as both longitudinal and lateral cyclic pitch of the blades. Engine RPM is controlled by a governor of which the setting can be also controlled by an engine control. The control forces for the airship that establish attitude and maneuvering control are derived from a summing of the individual lifting rotor thrust forces. Therefore, the individual rotor controls in each of the lifting units are not required to respond to those inputs as are normally utilized to establish the attitude of a helicopter but rather furnish the forces, in magnitude and direction, as are required by the control mixing demands of a central control system for the airship to establish the desired motion and attitude of the airship.

Forces and moments must be exerted on the airship hull as will cause it to move translationally, horizontally, vertically and sidewise, as well as to rotate it about its pitch axis and yaw axis. Moments could be applied to cause the airship hull to rotate about its longitudinal axis in roll but this control probably would not be necessary due to the high degree of roll stability because of the relatively large distance between the aerostat center of buoyancy and the center of gravity of the loaded airship. However, aerodynamically induced forces could be applied to establish control of the airship about its roll axis if desired and are discussed below. Vertical translational motion of the airship is primarily achieved by a simultaneous change in the collective pitch of all lifting units to either increase or decrease the vertical thrust, although vertical lifting forces can be created by changing the buoyancy of the aerostat as well as deriving aerodynamic lift from air flow over the hull in flight. Fore and aft translation of the airship would be accomplished: first by tilting the lift vector of all main rotors in the longitudinal direction through similar actuation of longitudinal cyclic pitch of the main rotors of all lifting units, and secondly by rotating all lifting units about the hinge attaching point to incline the lifting units fore or aft and locking them in this position. This could be accomplished either through an actuator connected to a supporting shaft of the lifting unit or unlocking the hinge fitting 26 and cause the lifting unit to rotate to the desired angle through the use of longitudinal cyclic pitch control of the lift rotor. It is anticipated that the control of the tilt angle of all lifting units would be established through a trim control at a master control station for the airship. The lateral side forces necessary for movement of the airship sidewise would be through similar application of cyclic pitch control of the main rotors of all lifting units to tilt the lift vectors of the rotors transversely of the airship longitudinal axis.

The primary moments involved in controlling the attitude of the aircraft are achieved by the application of differential collective pitch or cyclic pitch control of selected lifting units. The longitudinal pitching moment required to rotate the airship about its pitch axis is primarily provided by application of differential collective pitch of the main lifting rotors of the forward lifting units 22 and 23 and of the after lifting units 24 and 25. If elevators are installed on the airship the pitching moment can be augmented in forward flight by movement of these elevators. The moment required to rotate the airship about its yaw axis is primarily by either the application of differential transverse cyclic pitch between the main rotors of the forwardly located lifting units 22 and 23 and the after lifting units 24 and 25 or by the application of differential longitudinal cyclic pitch control of the main rotors of the lifting units 22 and 24 on one side and the lifting units 23 and 25 on the other side of the longitudinal axis of the airship. Supplemental yawing moments can be applied through actuation of an airship rudder in forward flight if a rudder is installed. The application of a moment to rotate the airship about its longitudinal axis in roll may be applied by differential actuation of the collective pitch control of the main lift rotor of the lifting units 22 and 24 on one side of the airship and of the lifting units 23 and 25 on the other side of the airship. Since the application of all of these forces by the lifting rotors of the lift units do not depend upon any forward flight motion of the airship, very precise control of the airship over a point on the ground can be achieved without heading the airship into the wind and in a zero airspeed condition.

A master control station for the airship can be located in a cockpit in the fuselage of one of the lifting units or could be installed in the airship hull. The individual control systems in each of the four lifting units are interconnected so that they respond to the one set of controls at the master control station. This interconnection may be accomplished through the use of an automatic flight control system, such as has been developed for large helicopters. This could take the form of a fly-by-wire link between the master control station and the actuators of the automatic flight control system that would be installed in each of the lifting units. This fly-by-wire link is a direct electrical linkage system interfaced with a central automatic control system which performs the automatic flight control system computation. The central automatic flight control system is a limited authority system which provides stability and control augmentation and auto-pilot-type capabilities. Handling qualities required for different flight regimes are met by selectable automatic flight control system modes. Inasmuch as the forces and moments that are necessary to control the airship are much lower if they are applied before the disturbing motion of the airship has developed to any degree, it is contemplated that sensors would be installed which would sense the disturbance and feed the necessary information to the airborne computer which would automatically establish the necessary forces and moments to correct the errant motion and maintain the airship in the desired mode of flight or hover. Such sensors could be installed on each of the lifting units and in the airship hull. A block diagram of the possible interconnecting flight control system for the airship is indicated in FIG. 10. In this particular diagram the master control station is shown as located in the after port lifting unit 25. If desired, standby cockpit controls could be installed in each of the lifting units to permit pilots in each lifting unit to operate the lifting unit controls in the event a failure should occur in the master control unit. This would be an emergency situation and coordination of the individual controls by the individual pilots would have to be through telephone communication or by matching pointers representing control positions to the proper positions commanded by the master pilot.

Table I indicates the modes of blade pitch control that must be established in the blades of the main lifting rotors of the four lifting units 22, 23, 24, 25 to establish the forces required to control the translational movement of the airship and the moments that must be applied to control its attitude. The master controls that feed the signals into the automatic flight control system which establishes the required mixing that produces the output to the pitch control actuators of the rotors of the nature shown in Table I may be of the conventional type with some modifications for the additional complexities involved in establishing both translational and attitude rotational movement. The controls might well be those of the conventional helicopter having a conventional collective pitch stick which would control the vertical translational motion, rudder pedals for controlling attitude in yaw and a control stick movable longitudinally and transversely which would control longitudinal and transverse translational motion, as well as pitch, and if incorporated, motion in roll. Longitudinal movement of the control stick would be programmed to either concurrently or separately supply signals to establish longitudinal translational motion and pitching of the airship as indicated in Table I. One convenient way of doing this would be to have the first increment of longitudinal motion of the control stick create signals to the pitch control of the rotors establishing only longitudinal translational motion. Longitudinal motion of the control stick beyond the initial increment would create signals to the rotor blade effective pitch controls for creating a pitching moment to the airship. Lateral motion of the control stick might supply signals to the lifting rotor blades which would create only translational motion as indicated in Table I, if roll control were not incorporated. If roll control were incorporated, the same arrangement could be used as for establishing pitch in which signals establishing rolling moments would be supplied when the transverse motion of the control stick went beyond an initial increment of motion. A number of other alternatives are obviously available, such as utilizing an auto-pilot to control the attitude of the airship in pitch and yaw and, if utilized, in roll in the hover mode. In this mode the longitudinal and the transverse motion of the stick would supply signals involving only translational motion of the airship in the equivalent directions. A trim control would be utilized to establish the desired tilt of all lifting units in the longitudinal direction and, if provided, to tilt the selected units transversely. Although Table I only indicates the nature of the actuation of the pitch control required of the main rotors of the lifting units for creating the forces which control the attitude of the airship, if movable control surfaces are installed on the aerostat hull, motions of the control stick and rudder at the master control station would create changes in the pitch of rotor blades that establish pitching and yaw moments and would also transmit signals to actuators for the control surfaces on the aerostat hull that would deflect them in the proper direction to apply supplementary pitching and yawing moments.

TABLE I

| Unit | Maneuver | | | | | |
| --- | --- | --- | --- | --- | --- | --- |
| | Upward translational motion | Forward translational motion | Right translational motion | Pitch nose down | Yaw nose right | Roll right |
| Forward Right Unit | Increase collective | Forward longitudinal cyclic and/or forward tilt of unit (trim) | Right lateral cyclic and/or right tilt of unit (trim) | Decrease collective | Right lateral cyclic and/or rear longitudinal cyclic | Decrease collective |
| Forward Left Unit | Increase collective | Forward longitudinal cyclic and/or forward tilt of unit (trim) | Right lateral cyclic | Decrease collective | Right lateral cyclic and/or forward longitudinal cyclic | Increase collective |
| Rear Right Unit | Increase collective | Forward longitudinal cyclic and/or forward tilt of unit (trim) | Right lateral cyclic and/or right tilt of unit (trim) | Increase collective | Left lateral cyclic and/or rear longitudinal cyclic | Decrease collective |
| Rear Left Unit | Increase collective | Forward longitudinal cyclic and/or forward tilt of unit | Right lateral cyclic | Increase collective | Left lateral cyclic and/or forward longitudinal cyclic | Increase collective |

TABLE I-continued

| Unit | Maneuver | | | | | |
|---|---|---|---|---|---|---|
| | Upward translational motion | Forward translational motion | Right translational motion | Pitch nose down | Yaw nose right | Roll right |
| | | (trim) | | | | |

Figure 5:
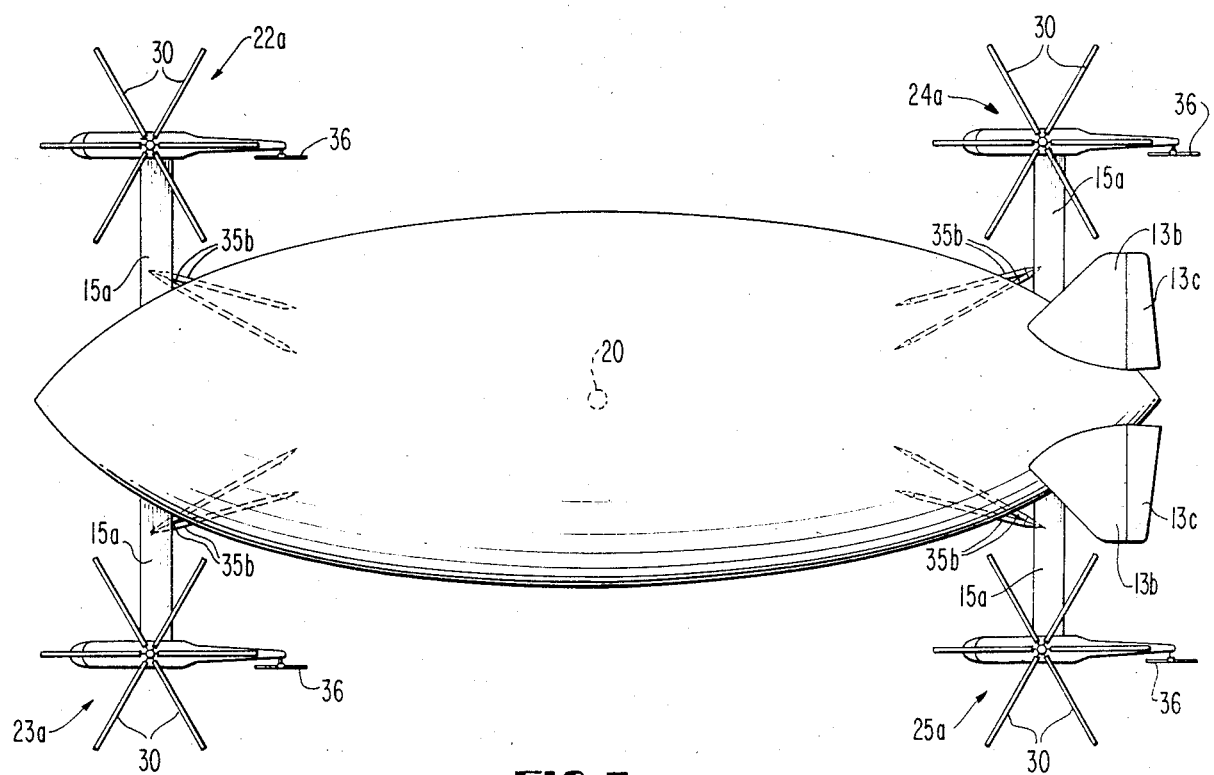
FIG. 5 is a plan view from above of the embodiment of FIG. 4.

FIGS. 4-6 illustrate a second embodiment of the invention utilizing an aerostat hull 10a of substantially elliptical shape in which the hull structure is that of the type utilized in the airship Hindenburg. The contour is that of the front and rear portions of the Hindenburg with the cylindrical center portion omitted. Although stabilizing fins and the associated moveable control surfaces on the airship hull would not be necessary, this particular embodiment has fins 13b mounted on the 45 degree planes on the upper rear portion of the airship hull with ruddervators 13c installed on these fins to supply supplementary pitching and yawing moments. The hull structure would be that of the conventional Zeppelin design in which a central beam 27 extends longitudinally along the central axis of the hull with circumferential rings 11a of varying diameters being located along the length and connected at intervals to the central beam with longitudinal beams 27a extending the length of the airship around the perimeter of the rings. Gas cells are located within the external covering of the airship between the main beams. As in the embodiment of FIGS. 1-3, thrust unit support beams 15a affixed to the hull structure of the airship extend transversely outwardly from opposite attaching points forwardly of the airship center of mass and rearwardly of the center of mass. Each beam 15a can conveniently be affixed to main rings of the hull with connections to the central beam 27 through a system of struts 29, 29a in the manner shown in FIGS. 4-6. The airship can be supported for ground handling on wheels 34 supported by a system of conventional struts 35, 35a, 35b affixed to the cantilevered beams 15 and the airship hull structure. The briefly described structure for the airship hull, the thrust unit support beams, and the associated supporting structure for the beam and the ground handling are merely typical configurations and many other variations of an aerostat hull for containing the buoyant lifting gas and attaching the thrust units to the hull are possible.

The arrangement of the thrust units is the same as that described for the embodiments of FIGS. 1-3 and the thrust units 22a, 23a, 24a, 25a are the same except that each thrust unit includes a supplementary rotor 36 at which the blades rotate in a vertical plane parallel to the longitudinal axis of the airship similar to the tail rotor of a conventional helicopter. Four thrust producing units 22a, 23a, 24a, 25a are each affixed to a laterally extending support beam 15 forwardly and rearwardly of the airship center of mass by means of a hinged fitting permitting rotation of the thrust unit in the same manner as the previously described embodiment of FIGS. 1-3. Due to the side thrust available from the supplementary rotors 36, the hinged fitting need not have provisions for lateral tilting of the thrust units, although provisions for lateral tilting are illustrated in FIG. 6.

Other than the supplementary rotor 36 the basic elements of this second embodiment are the same as those of FIGS. 1-3, the only significant difference being the addition of the supplementary rotor 36, to the main lifting rotor 30 of each thrust unit. The thrust unit being rigidly affixed to the structure in yaw, the supplementary rotor 36 of each unit does not function as antitorque device in the manner of single rotor helicopters but is utilized to establish a laterally directed thrust. This lateral thrust exerted in the same direction by the supplementary rotors of all thrust units can be utilized to established transverse translational motion of the airship, or a lateral force exerted in one direction by the supplementary rotors of the forwardly located thrust units and in the opposite direction by the supplementary rotors of the rearwardly located units can establish a yawing moment on the airship. The supplementary rotors can conveniently be driven by the engines which power the main lifting rotors but the drive shafting and gear trains can be sturdier than that of conventional helicopter antitorque tail rotors and the rotor should be a size to absorb considerable power. The supplementary rotor blades should also be capable of positive and negative pitch settings so as to obtain thrust reversal.

Figure 11:
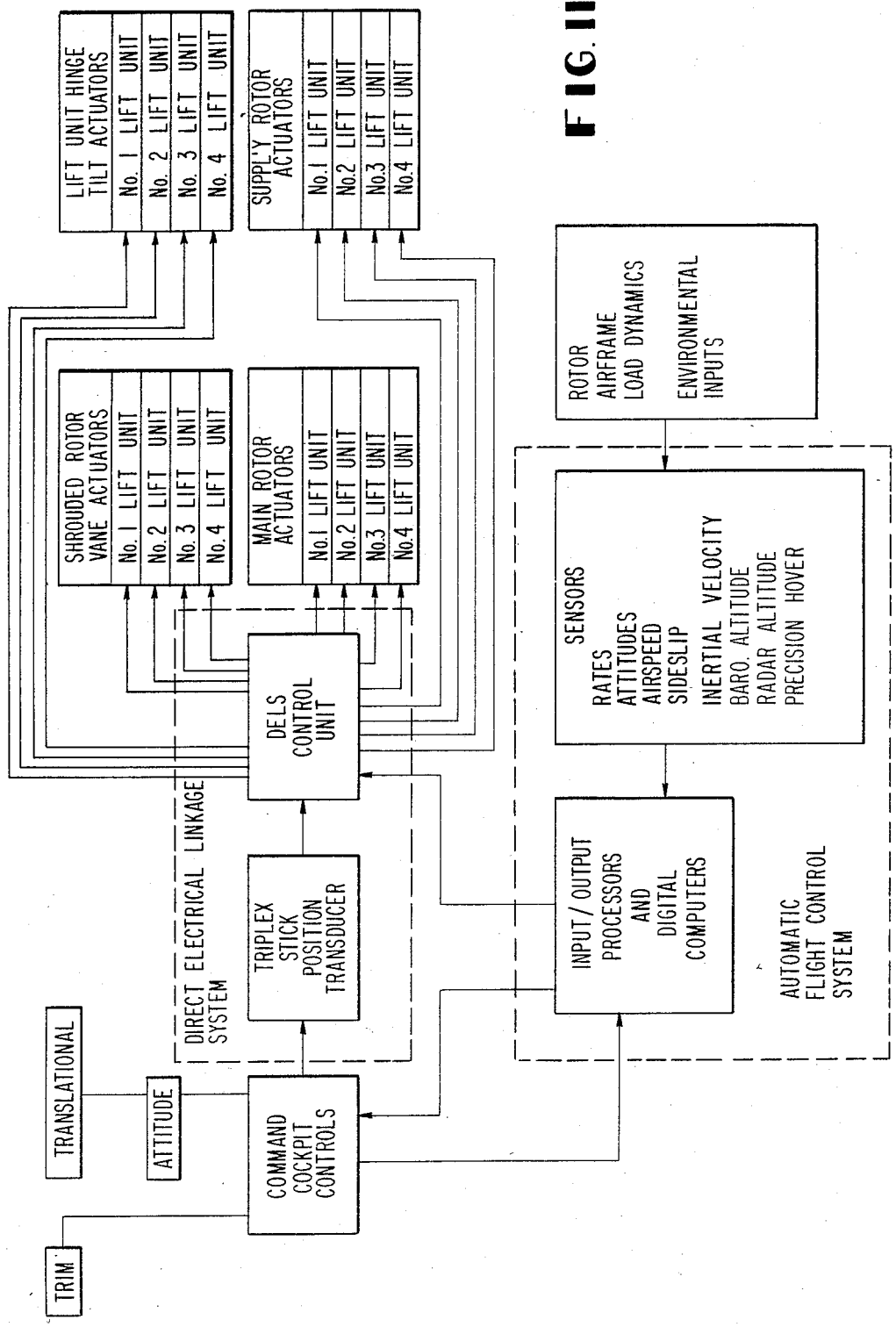
FIG. 11 is a schematic diagram illustrating a variation of the control interconnection system of FIG. 9.

Thus, all modes of rotor blade pitch control that are described in the embodiment of FIGS. 1-3 are applicable to the embodiment of FIGS. 4-6 with the lateral thrust of the supplementary rotor 36 of each thrust unit 22a, 23a, 24a, 25a of the embodiment of FIGS. 4-6 being available as supplementary means of establishing transverse translational motion of the airship as well as applying supplementary yawing moments. Table II indicates the mode of pitch control that is established in the blades of the supplementary rotors 36 of each lifting unit, as well as in the blades of the main lifting rotors, to establish the forces required to control the translational movement of the airship and the moments that must be applied to control the attitude of the airship in one direction. In this and the other Tables opposite control operation obviously is required to produce oppositely directed control forces on the airship. The automatic flight control system through its computer creates the necessary mixing that creates the output to the pitch control actuators of the main lifting rotors and the pitch control actuators of the supplementary rotors as is required to establish the desired motion of the airship. The automatic flight control system receives its signals from the master control at the master control station in the same manner as described for the embodiment of FIGS. 1-3. FIG. 11 is a schematic diagram indicating how the automatic flight control system receives signals, both from the master controls as well as the various sensors, and feeds signals into the direct electrical linkage system which in turn actuates the mechanical or hydraulic actuators of the rotors of the various thrust units, including both the main lifting rotors and the supplementary rotors. These sensors can include devices for sensing and measuring on-coming gusts, and signals from these sensing devices are fed into the command and control computor of the automatic flight control system which will actuate the pitch control of the main and supplementary rotors in a manner to counteract the gusts before they initiate any significant errant motion of the airship hull.

TABLE II

| Thrust Unit | Upward translational motion | Forward translational motion | Right translational motion | Pitch nose down | Yaw nose right | Roll right |
|---|---|---|---|---|---|---|
| Forward Right Unit | Increase collective | Forward longitudinal cyclic and/or forward tilt of unit (trim) | Right lateral cyclic and/or right tilt of unit (trim) and/or change supplementary rotor pitch to increase thrust to right | Decrease collective | Right lateral cyclic and/or rear longitudinal cyclic and/or change supplementary rotor pitch to increase thrust to right | Decrease collective |
| Forward Left Unit | Increase collective | Forward longitudinal cyclic and/or forward tilt of unit (trim) | Right lateral cyclic and/or change supplementary rotor pitch to increase thrust to right | Decrease collective | Right lateral cyclic and/or forward longitudinal cyclic and/or change supplementary rotor pitch to increase thrust to right | Increase collective |
| Rear Right Unit | Increase collective | Forward longitudinal cyclic and/or forward tilt of unit (trim) | Right lateral cyclic and/or right tilt of unit (trim) and/or change supplementary rotor pitch to increase thrust to right | Increase collective | Left lateral cyclic and/or rear longitudinal cyclic and/or change supplementary rotor pitch to increase thrust to left | Decrease collective |
| Rear Left Unit | Increase collective | Forward longitudinal cyclic and/or forward tilt of unit (trim) | Right lateral cyclic and/or change supplementary rotor pitch to increase thrust to right | Increase collective | Left lateral cyclic and/or forward longitudinal cyclic and/or change supplementary rotor pitch to increase thrust to left | Increase collective |

Figure 7:
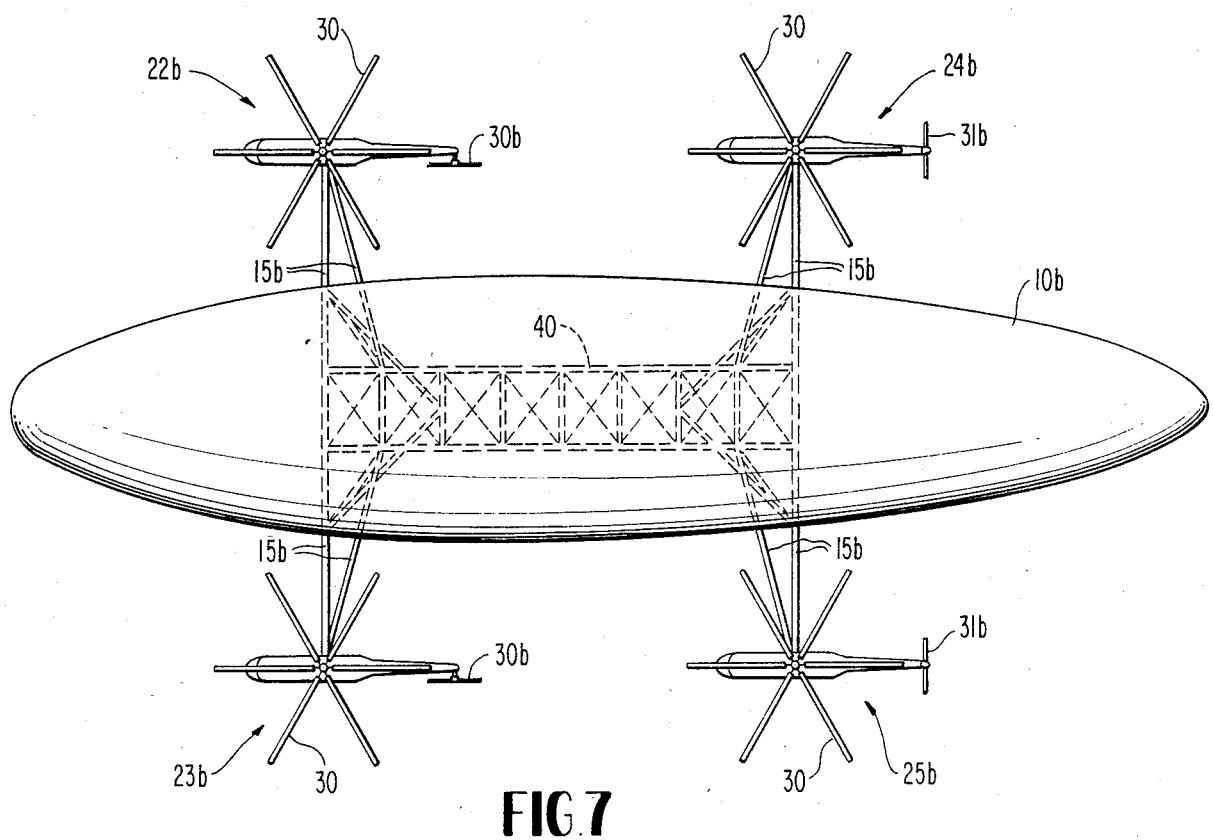
FIG. 7 is a side elevation of a third embodiment of the invention employing a non-rigid airship structure and a further sophistication of the thrust units.
Figure 8:
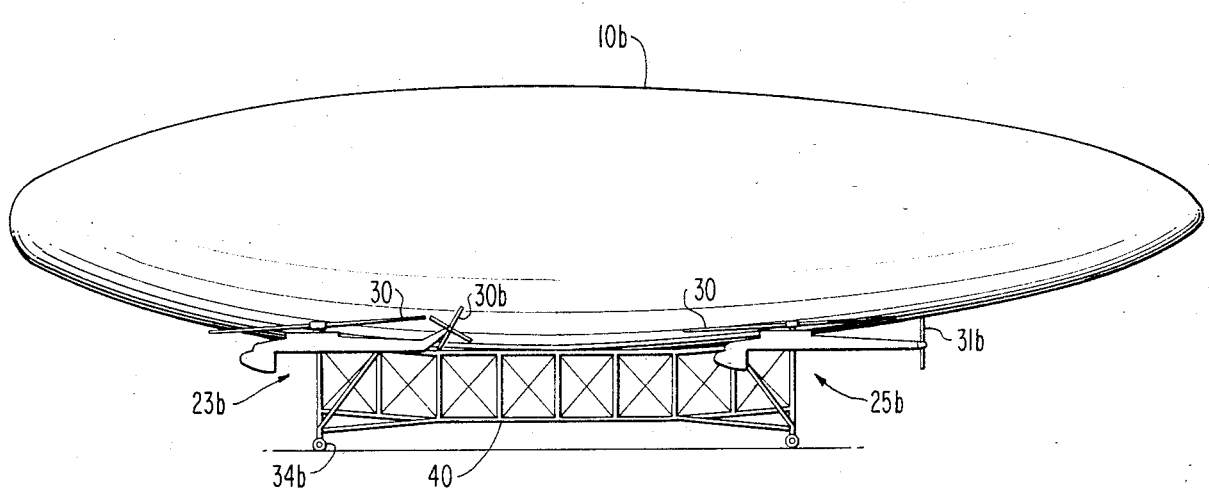
FIG. 8 is a plan view from above of the embodiment of FIG. 7.

A third embodiment of the invention is illustrated in FIGS. 7 and 8. This embodiment is similar to that of FIGS. 4–6 in that the thrust units each have a supplementary tail rotor in which the blades rotate in a vertical plane. Inasmuch as the aerostat hull can be any type of structure which holds a buoyant lifting gas, this particular embodiment illustrates an aerostat in which the hull is that of a non-rigid airship. The hull 10b is an elongated streamlined fabric envelope containing internal air ballonets and the internal pressure air system of a typical non-rigid airship required to maintain the lifting gas within the fabric envelope under a low pressure so that the fabric hull will maintain its shape. An external, longitudinally extending keel structure 40 is shown which would be supported by the conventional longitudinally extending curtains affixed to the fabric envelope hull of the non-rigid aerostat. The laterally extending beams 15b which support the thrust units 22b, 23b, 24b, and 25b are attached to and supported by the keel 40 at points forwardly of and rearwardly of the center of mass of the airship, as in the case of the previously described embodiments. For reasons which will subsequently be described, the thrust units probably would be rigidly attached to the respective lateral beams 15b and not have provisions for the pivoting hinge attachment described for the previous embodiment, although such a hinge mounting could be utilized if desired. The illustrated keel structure 40 is schematic in nature and obviously could be much more shallow and recessed into the lower portion of the non-rigid fabric envelope if desired. Although not illustrated, it would be possible to design a unit for a non-rigid aerostat in which no unitary longitudinal keel structure is utilized from which the thrust units are supported, in the manner illustrated, but in which the thrust unit supporting beams 15b are attached to the fabric of the aerostat envelope through curtains within the airship or other means and provisions are made for attaching the payload to the fabric of the non-rigid envelope in a manner to obtain adequate load distribution over the fabric envelope of the aerostat. Suitable ground handling wheels 34b could be affixed to the keel structure 40 or supported from struts extending downwardly from beneath the thrust units. Not only would it be possible to utilize an aerostat comprising the conventional non-rigid hull but an aerostat hull of the semi-rigid type could be utilized. Inasmuch as the structural configuration of the various types of lighter-than-air craft hulls are well known, no detailed description of these various types of aerostat hulls will be given. Any type of buoyant lifting gas aerostat hull would suffice with provisions for attaching the thrust units to the forward and after portions in order to apply the necessary control forces and thrust.

The fundamental difference between the third embodiment of FIGS. 7 and 8 and the second embodiment of FIGS. 4–6 is that the forward thrust units 22b, 23b have a supplementary rotor 30b mounted to rotate in the longitudinal vertical plane of the unit, as shown for the second embodiment, whereas the rear thrust units 24b, 25b each have a supplementary rotor 31b mounted for rotation in a vertical plane transversely of the unit and the longitudinal axis of the airship. Thus, the longitudinally aligned supplementary rotors 30b of the forward thrust units 22b, 23b can provide side thrust, as do the supplementary rotors of the embodiment of FIGS. 4-6, and the transversely aligned supplementary rotors 31b of the rear thrust units 24b, 25b provide thrust along the longitudinal axis of the airship. Since this longitudinal thrust of the supplementary rotors 31b is not dependent on the thrust generated by the main lifting rotors 30 of the thrust unit, no provisions need be incorporated to tilt the thrust units forwardly (or rearwardly) about a hinge mounting in order to obtain the necessary thrust along the longitudinal axis of the airship for establishing longitudinal translational motion at higher speed. In this third embodiment there is no requirement for a certain degree of heaviness in order that the thrust forces from the main lifting rotors 30, be of sufficient magnitude that the horizontal longitudinal component will provide the necessary propulsive force. For this reason the airship of this embodiment could be flown in a condition near static equilbrium, whereas a moderate degree of heaviness would be required for the first and second described embodiments. The side and the longitudinal thrust of the supplementary rotors 30b and 31b of the thrust units can also be applied to establish a yawing moment for the airship. Thrust from the longitudnally aligned supplementary rotors 30b of the forward units 22b, 23b could be utilized to establish transverse translational motion of the airship. However, since the supplementary rotors 30b of the forward thrust units would be somewhat forward of the yawing axis of the airship, the resulting yawing moment would have to be counteracted by establishing a differential pitch between the transversely aligned supplementary rotors 31b of the rear thrust units 24b, 25b. Other than the thrust vectoring that is provided by the side thrust of the supplementary rotors 30b mounted on either side of the forward portion of the airship and a longitudinal thrust of the supplementary rotors 31b mounted on either side of the rear portion of the airship, the movement and attitude of the airship controlled by the collective and cyclic pitch of the main rotors of the thrust units is as in the first described embodiment. Table III indicates the modes of blade pitch control that must be established in the blades of the main lifting rotors 30 and the supplementary rotors 30b and 31b of the thrust units 22b, 23b, 24b, 25b to control the movement and attitude of the airship. As in the previous embodiments the master control feeds signals into the automatic flight control system which establishes the required mixing to produce the required output to the pitch control actuators of the various rotors.

It should be understood that the positions of the supplementary rotors as shown in the embodiment of FIGS. 7 and 8 could be reversed, i.e. the transversely aligned supplementary rotors 31b installed on the forward thrust units 22b, 23b and the longitudinally aligned rotors 30b installed on the after thrust units 24b, 25b. This latter arrangement would probably not be as advantageous as the side thrust rotors 30b would establish a rather large yawing moment due to their location a considerable distance rearwardly of the yaw axis of the airship. Further, the arrangement illustrated in FIGS. 7 and 8 establishes a side force in resisting a lateral gust that is in a proper direction from the nose of the airship into the lateral gust. In this third embodiment of FIGS. 7 and 8, as well as in the several embodiments of FIGS. 4-6, the position of the supplementary rotor need not be rearwardly of the main lifting rotor 30 but the supplementary rotors of selected thrust units could be located forwardly of the main rotor if this would create more advantageous moment arms in establishing the control forces for the airship.

TABLE III

| Thrust Unit | Maneuver | | | | | |
|---|---|---|---|---|---|---|
| | Upward translational motion | Forward translational motion | Right translational motion | Pitch nose down | Yaw nose right | Roll right |
| Forward Right Unit | Increase collective | Forward longitudinal cyclic | Right lateral cyclic and/or right tilt of unit (trim) and/or change supplementary rotor pitch to increase thrust right | Decrease collective | Right lateral cyclic and/or rear longitudinal cyclic and/or change supplementary rotor pitch to increase thrust to right | Decrease collective |
| Forward Left Unit | Increase collective | Forward longitudinal cyclic | Right lateral cyclic and/or change supplementary rotor pitch to increase thrust to right | Decrease collective | Right lateral cyclic and/or forward longitudinal cyclic and/or change supplementary rotor pitch to increase thrust to right | Increase collective |
| Rear Right Unit | Increase collective | Change supplementary rotor pitch to increase forward thrust and/or forward longitudinal cyclic | Right lateral cyclic and/or right tilt of unit (trim) and/or change supplementary rotor pitch to increase forward thrust* | Increase collective | Left lateral cyclic and/or rear longitudinal cyclic and/or change supplementary rotor pitch to increase thrust to rear | Decrease collective |
| Rear Left Unit | Increase collective | change supplementary rotor pitch to increase forward thrust and/or forward | Right lateral cyclic and/or change supplementary rotor pitch to | Increase collective | Left lateral cyclic and/or forward longitudinal cyclic and/or change | Increase collective |

TABLE III-continued

| | Maneuver | | | | | |
|---|---|---|---|---|---|---|
| Thrust Unit | Upward translational motion | Forward translational motion | Right translational motion | Pitch nose down | Yaw nose right | Roll right |
| | | longitudinal cyclic | increase thrust to rear* | | supplementary rotor pitch to increase forward thrust | |

*to counteract yaw moment of forward units

FIGS. 9 and 9a illustrate a variation of a thrust unit which could be substituted for those shown in the embodiment of FIGS. 7 and 8, or other described embodiments, to provide both side thrust and longitudinal thrust. In this fourth embodiment, each of the four thrust units, located as previously described for the other embodiments, has a transversely aligned supplementary rotor 31c mounted for rotation in a vertical plane within a truncated duct 42 with hinged, vertically extending turning vanes 44, pivotally mounted within the duct rearwardly of the rotor 31c, in addition to the main lifting rotor 30. As in the other previously described lifting units the supplementary rotor 31c and the main lifting rotor 30 may be driven through connecting shafting by conventional turbine engine 38. The turning vanes are pivotably mounted to be moveable between a position parallel to the longitudinal axis of the airship and a fully deflected position in which the vanes are deflected outwardly from the longitudinal axis of the airship 90 degrees in the manner illustrated in the dotted lines 44a of FIG. 9. This "Ring-Tail" configuration permits the establishment of a side force by deflecting the vanes either partially or fully. Except when the vanes are fully deflected, a longitudinally extending component of the thrust from the supplementary rotor 31c is available for establishing longitudinal translational motion of the airship and differential longitudinal thrust of the supplementary rotors on oppositely located thrust units can be employed to establish a yawing moment. The vanes in the "Ring-Tail" of the thrust units are mounted to pivot outwardly so that the vanes of the thrust units on the left side of the airship deflect air outwardly to the left and the vanes of the thrust units on the right side of the airship deflect the air outwardly to the right of the airship, thus producing left and right side forces, respectively. For a given setting of the vanes, the components of the thrust that are exerted longitudinally and sidewise by the slipstream from the supplementary rotors are dependent upon the pitch of the supplementary rotor blades. Because of the components of the longitudinal and transverse thrust obtainable from the supplementary rotors in the "Ring-Tail", the thrust units need not be affixed to the supporting beam by a hinged mounting but would probably be rigidly affixed to the supporting beam. As in the case of the third embodiment of FIGS. 7 and 8, this "Ring-Tail" configuration would permit the airship to be operated close to an equilibrium condition as no significant component of the thrust of the main lifting rotors would be required to control the airship in flight. Table IV indicates the modes of blade pitch control that must be established in the blades of the main lifting rotors, the supplementary rotors in the "Ring-Tail" and the setting of the deflection vanes in the "Ring-Tail" to establish the forces required to control the motion and attitude of the airship. As before, the master controls feed signals into the automatic flight control system which in turn establishes the required mixing to produce the output required to the pitch control actuators of the rotors and to the actuators for the deflection vanes in order to establish the rotors and vanes in the position required to produce the necessary control forces for the airship.

Although the above described embodiments employ four thrust units, different numbers of units could be utilized as long as at least one unit is attached to the aerostat hull forwardly of the airship center of mass and one rearwardly of the center of mass. Obviously a symmetrical location of the thrust units is preferable so that an asymmetrical arrangement of thrust vectors is not necessary. Although all described embodiments utilize thrust units having a single main lifting rotor, units having multiple main lifting rotors could be utilized by following the principles outlined above.

TABLE IV

| | Maneuver | | | | | |
|---|---|---|---|---|---|---|
| Thrust Unit | Upward translational motion | Forward translational motion | Right translational motion | Pitch nose down | Yaw nose right | Roll right |
| Forward Right Unit | Increase collective | Change supplementary rotor pitch to increase forward thrust and/or forward longitudinal cyclic | Right lateral cyclic with no ring-tail vane deflection | Decrease collective | Right lateral cyclic and/or rear longitudinal cyclic and/or change supplementary rotor pitch to increase thrust to rear with no vane deflection | Decrease collective |
| Forward Left Unit | Increase collective | Change supplementary rotor pitch to increase forward thrust and/or forward longitudinal cyclic | Outward deflection ring-tail vanes and/or right lateral cyclic | Decrease collective | Right lateral cyclic and/or forward longitudinal cyclic and/or outward deflection ring-tail vanes | Increase collective |

TABLE IV-continued

| Thrust Unit | Maneuver | | | | | |
| --- | --- | --- | --- | --- | --- | --- |
| | Upward translational motion | Forward translational motion | Right translational motion | Pitch nose down | Yaw nose right | Roll right |
| Rear Right Unit | Increase collective | Change supplementary rotor pitch to increase forward thrust and/or forward longitudinal cyclic | Right lateral cyclic with no ring-tail vane deflection | Increase collective | Left lateral cyclic and/or rear longitudinal cyclic and/or outward deflection ring-tail vanes | Decrease collective |
| Rear Left Unit | Increase collective | Change supplementary rotor pitch to increase forward thrust and/or forward longitudinal cyclic | Outward deflection ring-tail vanes and/or right lateral cyclic | Increase collective | Left lateral cyclic and/or forward longitudinal cyclic and/or change supplementary rotor pitch to increase forward thrust with no vane deflection | Increase collective |

Although the hinged vanes in the shrouded rotor of each thrust unit in FIGS. 9 and 9A are mounted so as to pivot outwardly toward one side only of the longitudinal axis of the unit and the description in the text and Table IV take this into consideration, obviously the vanes could be supported by a structure such that they could be pivoted to positions on either side of the lifting unit longitudinal axis. In that case, vane deflection of the thrust units can generate lateral thrust both left and right.

Inasmuch as a primary, essential element of each lifting unit comprises a main lifting rotor comparable to a conventional helicopter, it obviously would be possible to substitute a conventional or modified helicopter for each lifting unit by providing a platform at the end of each transversely extending support beam of the illustrated embodiments with suitable tie downs for a helicopter. The tie downs could be of the quick disconnect type and, if desired, provisions could be installed for rotating the platform to permit tilting the helicopter longitudinally or transversely to provide the same results as are achieved by the thrust unit hinge mounting 26 previously described.

Reference in the above descriptions to the center of mass includes the mass of all elements of the airship including the internal gases contained within the aerostate hull, and is the point about which the vehicle would rotate in pure rotation when acted upon by a couple. Although different type thrust units are shown with respect to various types of aerostat hull structures, it should be understood that any type of aerostat hull structure could be utilized with any type of thrust unit. It should be further understood that the thrust of the rotors could be changed by varying their RPM in lieu of changing their collective pitch and the flight control system could operate in this manner in producing the same results described herein. Therefore, changes in rotor RPM could be substituted for changes in collective pitch in Tables I, II, III and IV, although it should be recognized that changes in collective pitch can be achieved much more rapidly than changes in RPM. Further, although the thrust producing units are indicated to be substantially the same in all embodiments, a mixture of different types of thrust units could be utilized of even more difference than is shown in the embodiments of FIGS. 7 and 8, e.g. thrust units with shrouded rotors of the "Ring-Tail" type could be used in conjunction with thrust units having only main lifting rotors or thrust units having vertically aligned, unshrouded supplementary rotors.

Although the described embodiments indicate an aerostat hull having a conventional elongated streamlined shape, it should be understood that the hull could be any shape, such as cylindrical or otherwise. Further, although the illustrated embodiments show four thrust units attached to the aerostat hull with the units located forwardly and rearwardly of the airship center of mass and on opposite sides of the longitudinal axis and center of mass of the airship, as few as two lifting units could be utilized. These could be affixed to the aerostat hull and located on opposite sides forward and rearward of the airship center of mass on its longitudinal center line or on opposite sides of and spaced from the longitudinal axis of the airship and its center of mass, which could even include a diagonal location. In this manner the vectored thrust of the two thrust units, as controlled from the single master controls, would establish moments on the airship hull to control its attitude while establishing translational thrust forces to effect any desired translational motion.

It should be understood that the foregoing disclosure relates only to some typical embodiments of the invention and that numerous modifications or alterations may be made therein without departing from the spirit and scope of the invention as set forth in appendant claims.

What is claimed is:

1. A vectored thrust airship comprising an aerostat hull containing a lighter-than-air gas, at least two pairs of thrust producing units each having a horizontally disposed main rotor with controllable pitch blades and means controlling the pitch of said main rotor blades collectively and cyclically to include longitudinal and lateral cyclic pitch control, means attaching said thrust units to said aerostat hull such that each of a first of said pairs are attached to said hull on opposite sides of the airship longitudinal axis forwardly of the center of mass of said airship and each of a second of said pairs are attached to said hull on opposite sides of the airship longitudinal axis rearwardly of said center of mass, power means connected to the main rotors of each said thrust unit rotor for rotating the rotor blades, a master flight control including a translational control for control of the translational motion of the airship along and perpendicular to its longitudinal axis and an attitude control for control of the angular attitude of the airship about its center of mass, said translational control including a longitudinal translational control for control of the airship motion longitudinally of its axis and a vertical translational control for control of the airship vertical translational motion perpendicular to its axis, said attitude control including a pitch control for control of the airship attitude in pitch and a yaw control for control of the airship attitude in yaw, means interconnecting said main rotor pitch control means of each of said thrust units and said master flight control for the similar actuation of said main rotor pitch control means of said two pairs of thrust units upon operation of a translational control and for differential actuation of the rotor pitch control means of two thrust units located on one side of said airship center of mass and two thrust units located on the other side of said center of mass upon operation of an attitude control, operation of said longitudinal translational control establishing similar actuation of the main rotor longitudinal cyclic pitch control means of said main rotor, operation of said vertical translational control establishing similar actuation of the main rotor collective pitch control means of said main rotors, and operation of said pitch control establishing a differential actuation of the main rotor blade collective pitch control means of the main rotors of the thrust units forwardly of and rearwardly of the airship center of mass.

2. The airship of claim 1 wherein operation of said yaw control establishes a differential actuation of the main rotor cyclic pitch control means of the main rotors on thrust units located on opposite sides of the airship center of mass.

3. The airship of claim 2 wherein operation of said yaw control establishes a differential actuation of the main rotor lateral cyclic pitch control means of the main rotors of said first and second pairs of thrust units, respectively.

4. The airship of claim 2 wherein operation of said yaw control establishes a differential actuation of the main rotor longitudinal cyclic pitch control means of main rotors of thrust units located on opposite sides of the airship longitudinal axis.

5. The airship of claim 1 wherein said translational control additionally includes a lateral translational control for control of the airship motion laterally of its axis in a horizontal direction and said main rotor pitch control means of all said thrust units is operatively connected to said master flight control for similar actuation of said main rotor lateral cylcic pitch control means upon operation of said lateral translational control means.

6. The airship of claim 2 wherein said thrust unit attaching means includes pivoting means allowing pivotal motion of at least two of said thrust units on opposite sides of the airship center of mass about a first pivot axis extending transversely of the airship longitudinal axis and said master flight control includes a longitudinal motion trim control connected to means for establishing each of said at least two units at an angular position on said first pivot axis as will establish a thrust vector in the direction of the longitudinal aixs of the airship.

7. The airship of claim 6 wherein said attaching means of thrust units additionally include means allowing pivotal motion of at least two of said thrust units on opposite sides of the airship center of mass about a second pivot axis extending in the direction of the airship longitudinal axis and the said master flight control includes a transverse motion trim control connected to means for establishing each of said at least two units at an angular position on said second pivot axis as will establish a thrust vector in a direction transversely of the longitudinal axis of the airship.

8. A vectored thrust airship comprising an aerostat hull containing a lighter-than-air gas, at least two pairs of thrust producing units each having a horizontally disposed main rotor with controllable pitch blades and means controlling the pitch of said main rotor blades collectively and cyclically to include longitudinal and lateral cyclic pitch control, means attaching said thrust units to said aerostat hull such that each of a first of said pairs are attached to said hull on opposite sides of the airship longitudinal axis forwardly of the center of mass of said airship and each of a second of said pairs are attached to said hull on opposite sides of the airship longitudinal axis rearwardly of said center of mass, power means connected to the main rotors of each of said thrust unit rotor for rotating the rotor blades, a master flight control including a translational control for control of the translational motion of the airship along and perpendicular to its longitudinal axis and an attitude control for control of the angular motion of the airship about its center mass, said translational control including a longitudinal translational control for control of the airship motion longitudinaly of its axis and a vertical translational control for control of the airship vertical translational motion perpendicular to its axis, said attitude control including a pitch control of the airship attitude in pitch and a yaw control for control of the airship attitude in yaw, means interconnecting said main rotor pitch control means of each of said thrust units and said master flight control for similar actuation of said main rotor pitch control means of the main rotors of said two pairs of thrust units upon operation of a translational control and for differential actuation of the rotor pitch control means of the main rotors of two thrust units located on one side of said airship center of mass and the main rotors of two thrust units located on the other side of said center of mass upon operation of an attitude control, operation of said vertical translational control establishing similar actuation of the main rotor collective pitch control means of the main rotors of said thrust units, operation of said pitch control establishing a differential actuation of the main rotor collective pitch control means of the main rotors of thrust units forwardly of and of the main rotors of thrust units rearwardly of the airship center of mass, and operation of said yaw control establishing a differential actuation of the main rotor cyclic pitch control means of the main rotors of thrust units located on opposite sides of the airship center of mass.

9. The airship of claim 8 wherein operation of said yaw control estabishes a differential actuation of the main rotor lateral cyclic path control means of the main rotors of said first and second pairs of thrust units, respectively.

10. The airship of claim 8 wherein operation of said yaw control establishes a differential actuation of the main rotor longitudinal cyclic pitch control means of the main rotors of thrust units located on opposite sides of the airship longitudinal axis.

11. The airship of claim 8 wherein said translational control additionally includes a lateral translational control for control of the airship motion laterally of its axis in a horizontal direction and operation of said lateral translational control establishing a similar actuation of the main rotor lateral cyclic pitch control means of the main rotors of said thrust units.

12. The airship of claim 8, additionally comprising at least one pair of power driven supplementary rotors having controllable pitch blades rotating in vertically aligned planes transversely of the airship longitudinal axis with each of the supplementary rotors of said pair located on opposite sides of said airship longitudinal axis and center of mass, means for controlling the pitch of each of said pair of supplementary rotor blades collectively, and means connecting said supplementary rotor pitch control means of each said supplementary rotor and said master flight control for similar actuation of said supplementary rotor pitch control means of said pair of supplementary rotors upon operation of said longitudinal translational control and for differential actuation of the supplementary rotor pitch control means of the supplementary rotor of each said pair upon operation of said yaw control.

13. The airship of claim 12 additionally comprising a second pair of power driven supplementary rotors having controllable pitch blades rotating in a vertical plane extending along the airship longitudinal axis with each one of the supplementary rotors of said second pair being affixed to said airship hull on opposite sides of the airship longitudinal axis and center of mass, means controlling the pitch of said second pair of supplementary rotor blades collectively, and means connecting said second pair of supplementary rotor pitch control means and said master flight control for differential actuation of each one of the supplementary rotor pitch control means of the supplementary rotor of each said second pair upon operation of said yaw control.

14. The airship of claim 13 wherein said translational control means includes a lateral translational control for control of the airship laterally of its axis in a horizontal direction and operation of said lateral translational control establishing a similar actuation of said second pair of supplementary rotor blade pitch control means.

15. The airship of claim 8 additionally comprising at least one pair of power driven supplementary rotors having controllable pitch blades rotating in vertically aligned planes extending along the airship longitudinal axis with each of the supplementary rotors of said pair located on opposite sides of said airship longitudinal axis and center of mass, means for controlling the pitch of each of said pair of supplementary rotor blades collectively, and means connecting said supplementary rotor pitch control of each said supplementary rotor and said master flight control for differential actuation of the supplementary rotor pitch control means of each of said pair of supplementary rotors upon operation of said yaw control.

16. The airship of claim 8 additionally comprising two pairs of power driven supplementary rotors having controllable pitch blades, one of said pairs being affixed to opposite sides of said airship hull forwardly of the airship center of mass and the second of said pairs being affixed to opposite sides of said airship hull rearwardly of the airship center of mass, the rotors of one of said rotor pairs being mounted for rotation in a vertically aligned plane transversely of the airship longitudnal axis and the rotors of the other of said rotor pairs being mounted for rotation in a vertically aligned plane extending along the airship longitudinal axis, means for controlling the pitch of each of said supplementary rotor blades collectively, and means connecting said supplementary rotor pitch control means of each said supplementary rotor and said master flight control for similar actuation of the supplementary rotor pitch control means of each said supplementary rotor mounted for rotation in a plane transversely of the airship longitudinal axis upon operation of said longitudinal translational control and for similar actuation of said supplementary rotor pitch control means of said supplementary rotors mounted for rotation in a vertically aligned plane extending along the airship longitudinal axis and differential actuation of said supplementary rotor pitch control means of said rotors mounted for rotation in a plane transversely of said airship longitudinal axis upon operation of said yaw control.

17. The airship of claim 16 wherein said translational control means includes a lateral translational control for control of the motion of the airship laterally of its axis in a horizontal direction and said supplementary rotor blade pitch control means of supplementary rotors mounted for rotation in a vertically aligned plane extending along the airship longitudinal axis is connected to said master flight control for similar actuation of said supplementary rotor blade pitch control means of said supplementary rotors rotating in said plane extending along the airship longitudinal axis upon operation of said lateral translational control means.

18. The airship of claim 8 additionally comprising a powered shrouded rotor unit having rotor blades rotating in a vertically aligned plane extending transversely of the airship longitudinal axis on each of at least one pair of said two pairs of thrust units, means for controlling the pitch of the rotor blades of each said shrouded rotor unit collectively, each said shrouded rotor unit including a set of vertically extending vanes pivotally mounted rearwardly of the shrouded rotor for rotation about a vertical axis and means for setting said set of vanes at selected angles with respect to the longitudinal axis of the airship, means operatively connecting said shrouded rotor pitch control means of each said shrouded rotor unit and said master flight control for similar actuation of each of said shrouded rotor pitch control means upon operation of said longitudinal translational control, and means operatively connecting said vane setting means of each set of vanes of said one pair of thrust units and said master flight control for movement of the vanes of each said set to an angular position in the same direction upon operation of said yaw control means.

19. The airship of claim 18 wherein each pair of said two pairs of thrust units includes a shrouded rotor unit, said means operatively connecting said shrouded rotor blade pitch control means and said master control similarly actuates all said shrouded rotor blade pitch control means upon operation of said longitudinal translational control and said means operatively connecting said vane setting means and said master flight control moves the sets of vanes of the shrouded rotor units on one of said two pairs of thrust units to an angular position in one direction with respect to the airship longitudinal axis and moves the sets of vanes of the shrouded rotor units of the others of two pairs of thrust units to an angular position in the opposite direction with respect to the airship longitudinal axis upon operation of said yaw control.

20. The airship of claim 8 additionally comprising a powered shrouded rotor unit having rotor blades rotating in a vertically aligned plane extending transversely of the airship longitudinal axis on each of said two pairs of thrust units, means for controlling the pitch of the rotor blades of each said shrouded rotor unit collectively, each said shrouded rotor unit including a set of vertically extending vanes pivotally mounted rearwardly of the shrouded rotor for motion about a vertical axis and means for setting said set of vanes at selected angles with respect to the longitudinal axis of the airship, means operatively connecting the shrouded rotor blade pitch control means of each said shrouded rotor unit and said master flight control for similar actuation of each of said shrouded rotor blade pitch control means upon operation of said longitudinal translational control and means operatively connecting said master flight control and said vane setting means of at least one shrouded rotor unit of each of said two pairs of thrust units on opposite sides of the airship longitudinal axis for movement to angular positions in opposite directions upon operation of said yaw control.

21. The airship of claim 20 additionally comprising means connecting the shrouded rotor blade pitch control means of the other of said at least one shrouded rotor unit of each of said two pairs of thrust units on opposite sides of the airship longitudinal axis and said master flight control for differential actuation of said shrouded rotor blade pitch control means upon operation of said yaw control.

22. The airship of claim 20 wherein each said translational control includes lateral translational control for control of the movement of the airship transversely of its longitudinal axis in the horizontal direction and said shrouded rotor blade pitch control means of each of a shrouded rotor unit on a thrust unit of each of said two pairs of thrust units on the same side of the airship longitudinal axis is operatively connected to said master flight control for similar actuation of said shrouded rotor blade pitch control means of the immediately aforesaid shrouded rotor units on the same side of the airship longitudinal axis and the vane setting means of each of the immediately aforesaid shrouded rotor units on the same side of the airship longitudinal axis are operatively connected to said master flight control means for movement of the vanes to an angular position in the same direction upon operation of said lateral translational control.

23. A vectored thrust airship comprising an aerostat hull containing a lighter-than-air gas, at least two pairs of thrust producing units each having a horizontally disposed main rotor with controllable pitch blades and means controlling the pitch of said main rotor blades collectively, means attaching said thrust units to said aerostat hull such that each of a first pair of said thrust units are attached to said hull on opposite sides of the airship longitudinal axis forwardly of the center of mass of said airship and each of a second pair of said units are attached to said hull on opposite sides of the airship longitudinal axis rearwardly of said center of mass, each said thrust units additionally having an shrouded rotor unit with blades rotating in a vertically aligned plane extending transversely of the airship longitudinal axis and means for controlling the pitch of said shrouded rotor blades collectively, each said shrouded rotor unit including a set of vertically extending vanes pivotally mounted rearwardly of the shrouded rotor for rotation about a vertical axis and means for setting said set of vanes at selected angles with respect to the longitudinal axis of the airship, power means connected to each said thrust unit rotor for rotating the rotor blades of said unit, a master flight control including a translational control for control of the translational motion of the airship along and perpendicular to its longitudinal axis and an attitude control for control of the angular motion of the airship about its center of mass, said translational control including a longitudinal translational control for control of the airship motion longitudinally of its axis and a vertical translational control for control of the airship vertical translational motion perpendicular to its axis, said attitude control including a pitch control for controlling the airship attitude in pitch and a yaw control for control of the airship attitude in yaw, and means connecting said master flight control and said vane setting means of selected thrust units for setting the vanes of said selected units at angles producing thrust by said selected units transversely of the airship longitudinal axis required to effect desired motion of the airship in directions having components perpendicular to the airship longitudinal axis upon operation of said master flight control, means connecting said rotor blade pitch control means of each of said thrust units and said master flight control for similar actuation of said rotor blade pitch control means of said two pairs of thrust units upon operation of a translational control and for differential actuation of the rotor blade pitch control means of two thrust units located on one side of said airship center of mass and two thrust units located on the other side of said center of mass upon operation of an attitude control, operation of said longitudinal translational control establishing similar actuation of the shrouded rotor blade pitch control means of said at least two thrust units, operation of said vertical translational control establishing similar actuation of the main rotor collective pitch control means of said two pairs of thrust units, operation of said pitch control establishing a differential actuation of the main rotor pitch control means of the thrust units forwardly of and of the thrust units rearwardly of the airship center of mass, and means operatively connecting said master flight control and said vane setting means of at least one shrouded rotor unit of each of said two pairs of thrust units on opposite sides of the airship longitudinal axis for movement in opposite directions upon operation of said yaw control.

24. The airship of claim 23 wherein each said translational control includes a lateral translational control for control of the movement of the airship transversely of its longitudinal axis in the horizontal direction and said shrouded rotor blade pitch control means of each of a shrouded rotor unit on a thrust of each of said two pairs of thrust units of the same side of the airship longitudinal axis is operatively connected to said master flight control for similar actuation of said shrouded rotor blade pitch control means of the immediately aforesaid shrouded rotor units on the same side of the airship longitudinal axis and the vane setting means of each of the immediately aforesaid shrouded rotor units on the same side of the airship longitudinal axis are operatively connected to said master flight control for movement of the vanes in the same direction upon operation of said lateral translational control.

* * * * *